(12) United States Patent
Das Sharma et al.

(10) Patent No.: US 7,809,969 B2
(45) Date of Patent: Oct. 5, 2010

(54) USING ASYMMETRIC LANES DYNAMICALLY IN A MULTI-LANE SERIAL LINK

(75) Inventors: Debendra Das Sharma, Santa Clara, CA (US); Ajay V. Bhatt, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 11/321,116

(22) Filed: Dec. 28, 2005

(65) Prior Publication Data

US 2007/0150762 A1   Jun. 28, 2007

(51) Int. Cl.
G06F 1/32 (2006.01)
(52) U.S. Cl. .................. 713/324; 713/323; 710/305
(58) Field of Classification Search .......... 713/323, 713/324; 710/305
See application file for complete search history.

(56) References Cited

U.S. PATENT DOCUMENTS

| | | | |
|---|---|---|---|
| 6,009,488 A | 12/1999 | Kavipurapu | |
| 6,047,347 A * | 4/2000 | Hansen et al. | 710/307 |
| 7,136,953 B1 * | 11/2006 | Bisson et al. | 710/307 |
| 7,157,940 B1 * | 1/2007 | Ong | 326/93 |
| 7,188,263 B1 * | 3/2007 | Rubinstein et al. | 713/300 |
| 7,216,245 B2 * | 5/2007 | Hsu et al. | 713/324 |
| 7,230,549 B1 * | 6/2007 | Woodral et al. | 341/52 |
| 2007/0067548 A1 * | 3/2007 | Juenger | 710/315 |

OTHER PUBLICATIONS

"Collegiate Dictionary"—Merriam-Webster—Tenth Edition—p. 1174.*

* cited by examiner

*Primary Examiner*—Thuan N Du
(74) *Attorney, Agent, or Firm*—Derek J. Reynolds (57) ABSTRACT

A method, device, and system are disclosed. In one embodiment, the method comprises transitioning one or more lanes of a multi-lane serial link from a fully operational power state to a low power state and keeping one or more other lanes of the multi-lane serial link in the fully operational power state to allow one or more data transfers across the remaining operational lanes in the link.

10 Claims, 6 Drawing Sheets

| [12:5] | [4] | [3] | [2] | [1] | [0] |
|---|---|---|---|---|---|
| N_FTS[7:0] | X1 Capable | X1 Capable | X1 Capable | X1 Capable | PowerSavingsCapable |

USING ASYMMETRIC LANES DYNAMICALLY IN A MULTI-LANE SERIAL LINK

FIELD OF THE INVENTION

The invention is related to a multi-lane serial link. More specifically, the invention relates to dynamically using asymmetric lanes in a multi-lane serial link with a goal of lowering system power consumption.

BACKGROUND OF THE INVENTION

The PCI Express™ interface protocol, as defined by the PCI Express Base Specification, Revision 1.0a (Apr. 15, 2003), is fast becoming a widely used standard across the computer industry for a high-speed data communication link. A PCI-Express™ link is made of one or more lanes. A single lane is a full-duplex (i.e. 2-way) differential serial interconnection between two devices. Each device that is coupled to the link has a transmitter and a receiver in each lane of the link. A multi-lane PCI-Express™ link is very modifiable because each lane can actually become a complete link to transfer information. For example, on a x16 link has 16 independent full-duplex serial lanes. It is possible to shut down 15 lanes and keep a fully operational two-way interconnect running between two devices with the remaining single operational lane. Devices in modern computers have become quite computationally powerful. This has increased performance, but it also tends to increase power consumption. Power savings per device is important in almost any computer system produced today. It is beneficial in a modern computer system to save as much power as possible. These savings can come from the processor, the motherboard, as well as any peripheral devices that are plugged into one or more links present in the computer system. Power savings on the PCI-Express™ link could provide significant system power savings. Additionally, though PCI-Express™ is one of the most common multi-lane serial links in the industry today, future multi-lane serial links as well as the peripheral devices they connect, would also benefit from power savings.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method, device, and system to use asymmetric lanes dynamically in a multi-lane serial link to reduce power consumption are disclosed. In the following description, numerous specific details are set forth. However, it is understood that embodiments may be practiced without these specific details. In other instances, well-known elements, specifications, and protocols have not been discussed in detail in order to avoid obscuring the present invention.

Although the specific embodiments described herein specifically reference PCI-Express™, it is understood that the detailed descriptions within the embodiments below could potentially be implemented on any multi-lane serial link that has multiple power states to attain power savings across the link. More specifically, the embodiments described could work on any multi-lane serial link that has the capability of allowing each independent lane to transition between at least a low power state and a fully operational power state.

Figure 1:
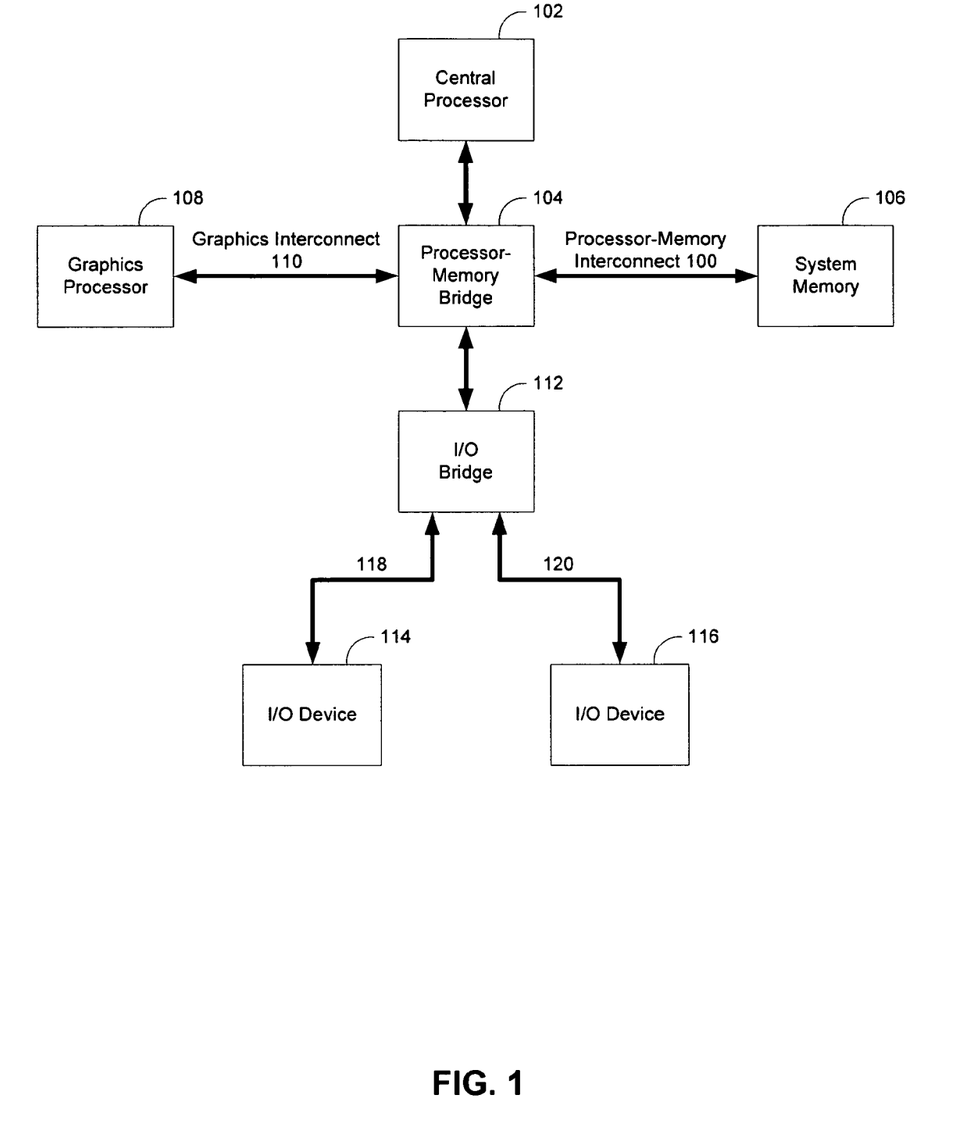
FIG. 1 is a block diagram of a computer system which may be used with embodiments of the present invention.

FIG. 1 is a block diagram of a computer system which may be used with embodiments of the present invention. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100 through processor-memory bridge 104. In another embodiment, there are multiple central processors coupled to processor-memory interconnect (multiple processors are not shown in this figure).

Processor-memory interconnect 100 provides the central processor 102 and other devices access to the memory subsystem. In one embodiment, a system memory controller that controls access to system memory 106 is located on the same chip as processor-memory bridge 104. In another embodiment, a system memory controller is located on the same chip as central processor 102. Information, instructions, and other data may be stored in system memory 106 for use by central processor 102 as well as many other potential devices. In one embodiment, a graphics processor 108 is coupled to processor-memory bridge 104 through a graphics interconnect 110.

In one embodiment, I/O devices 114 and 116 are coupled to system I/O interconnects 118 and 120 and to processor-memory interconnect 100 through I/O bridge 112 and processor-memory bridge 104. I/O Bridge 112 is coupled to processor-memory interconnect 100 (through processor-memory bridge 104) and system I/O interconnects 118 and 120 to provide an interface for an I/O device to communicate with a device on the processor-memory interconnect 100.

In one embodiment, the computer system in FIG. 1 implements one or more PCI-Express™ interconnects. In one embodiment, I/O devices 114 and 116 are PCI-Express™ endpoints. In another embodiment, graphics interconnect 110 is a PCI-Express™ x16 interconnect. In many embodiments, there are multiple PCI-Express™ interconnects between different devices as shown in FIG. 1.

Figure 2:
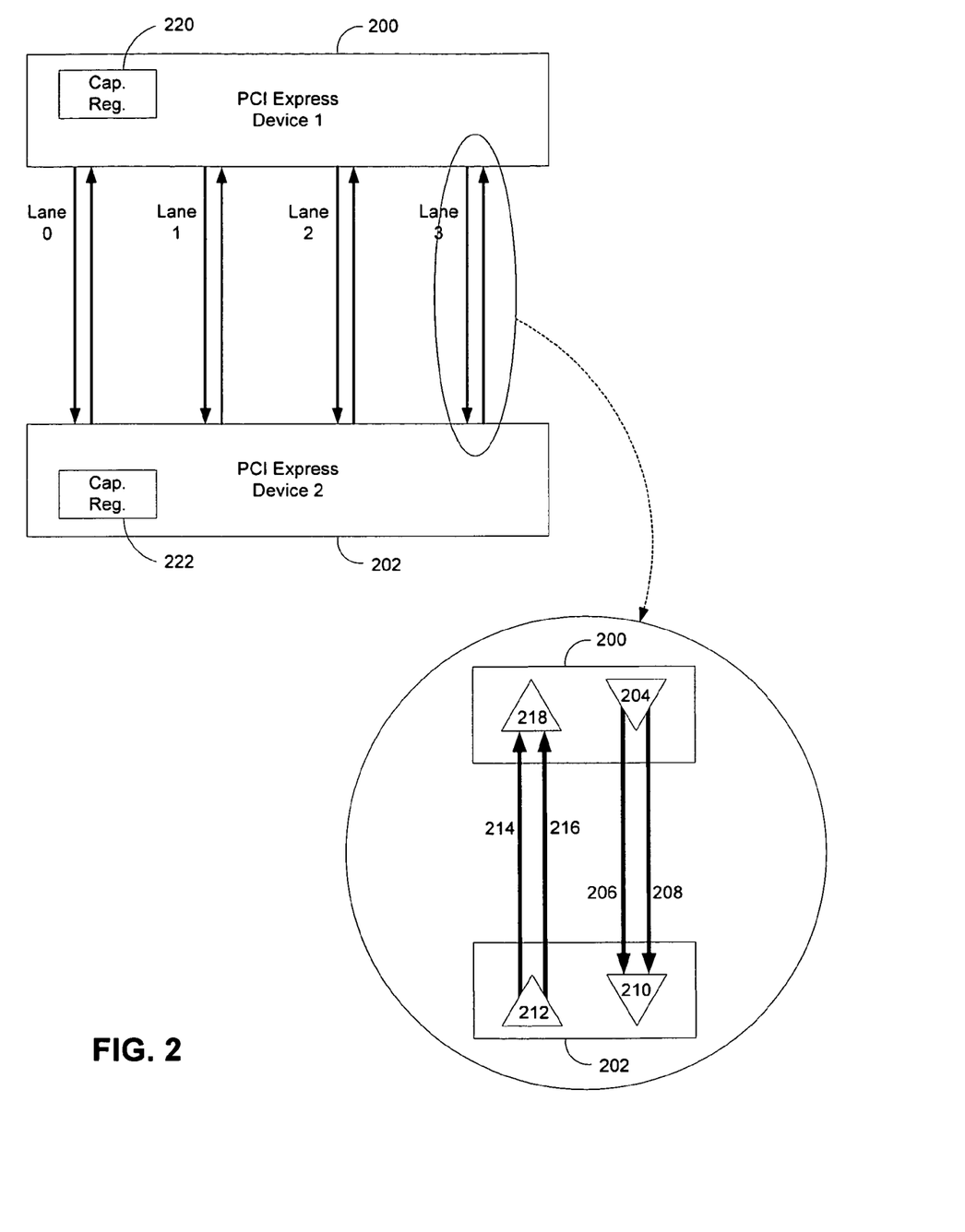
FIG. 2 is a block diagram of one embodiment of two PCI-Express™ devices linked with a 4-lane link (i.e., interconnect).

FIG. 2 is a block diagram of one embodiment of two PCI-Express™ devices linked with a 4-lane link (i.e., interconnect). In different embodiments, the two PCI-Express™ devices, Device 1 (200) and Device 2 (202) could be any two devices in a computer system that are directly connected with a multi-lane PCI-Express™ link. In different embodiments, the PCI-Express™ link can be any number of lanes, greater than one, that comply with the PCI-Express™ specification. In one embodiment, the PCI-Express™ interconnect is a 4-lane link and each lane consists of four wires. Specifically, each lane in a PCI-Express™ full-duplex (i.e. 2-way) differential serial interconnection between two devices requires four wires.

For example, FIG. 2 shows the specific wiring requirements for lane 3 in the larger dotted circle. Device 1 (200) has a transmitter 204 that sends data serially on two wires 206 and 208. The two wires comprise a differential signal pair. The first wire 206 sends the signal itself and the second wire 208 sends the inverse of the signal. Device 2 (202) has a receiver 210 that receives the signals from the differential signal pair (206 and 208) transmitted by device 1 (200). Additionally, a second differential signal pair comprising wires 214 and 216 is utilized to send signals from the device 2 (202) transmitter 212 to the device 1 (200) receiver 218. This set of four wires comprises one lane of a full-duplex differential serial link, of which there are four lanes in the present embodiment.

Each of the transmitters require a certain amount of power to operate, but precisely how much depends somewhat on the power state of the link. There are multiple power states associated with PCI-Express™. The different power states are defined in detail within the PCI-Express™ specification. The L0 power state constitutes full power operation of the PCI-Express™ link between two devices. The L0s power state saves a certain amount of power consumption in comparison to the L0 power state. During L0s, all lanes of the link in each individual direction go idle. Thus, L0s is asymmetric in nature since each side can shut down its transmitters independently. During L0s, the PLL (phase lock loop) keeps running so exit from the L0s power state has lower latency than other power savings states that turn off the PLL.

However, the mandatory UpdateFC (Update Flow Control) flow control packets must be sent back and forth between two devices coupled to a PCI-Express™ link every certain period of time. UpdateFC flow control packets are data link layer packets (DLLPs) that send updated credit information between the two devices. In current scenarios, a link that has all lanes enter the L0s state can only be in the L0s power state for a limited amount of time, because in order for a device to send the UpdateFC packets across the link, the transmitters must exit the L0s state and return to the L0 operational state. Thus, it would be desirable to maintain a L0s power savings state without having to exit the state frequently, while still maintaining partial link communications.

In one embodiment, both device 1 (200) and device 2 (202) have logic incorporated to transition one or more lanes from the L0 power state to the L0s power state. In one embodiment, if N is the number of lanes in the link, device 1 and device 2 each have the capability to transition 1 to N−1 transmission lanes in the link from the L0 power state to the L0s power state. In this embodiment, once the 1 to N−1 transmission lanes have been transitioned to the L0s power state, the remaining lane(s) that are still fully operational in the L0 power state to transmit the mandatory UpdateFC flow control packets, along with any other data transactions. In different embodiments, this process to transition from 1 to N−1 lanes of the link from full operation in the L0 power state to a power savings mode in the L0s power state can be performed asymmetrically or symmetrically. Thus, in one embodiment, both devices coupled to the link decrease the number of lanes transmitting in the L0 power state in unison. In another embodiment, one device can decrease the number of lanes transmitting in the L0 power state while the other device continues to transmit with all lanes in the L0 power state.

For example, in one embodiment, 10% of the total data transmitting across the link is originating at device 1 and being sent to device 2, while the opposite is true for the reverse direction (90% of the totally data originates at device 2 and is being sent to device 1). In this example, the transmission circuitry (i.e., logic) within device 1 is fully operational for every lane even though it potentially is not being utilized. Thus, in this embodiment, it may be beneficial to shut down a portion of the transmission lanes (up to 3 lanes) from device 1 to device 2 to lower power consumption without compromising any data throughput bandwidth.

In one embodiment, each device may have the capability to selectively put one or more of its transmission lanes into the L0s power savings state from the fully operational L0 power state. A capabilities register on each device (220 for Device 1 and 222 for Device 2) may be located on each respective device to notify another device whether these capabilities are present. The capabilities themselves, as well as a more detailed version of the capabilities register, are discussed in more detail below.

Figure 3:
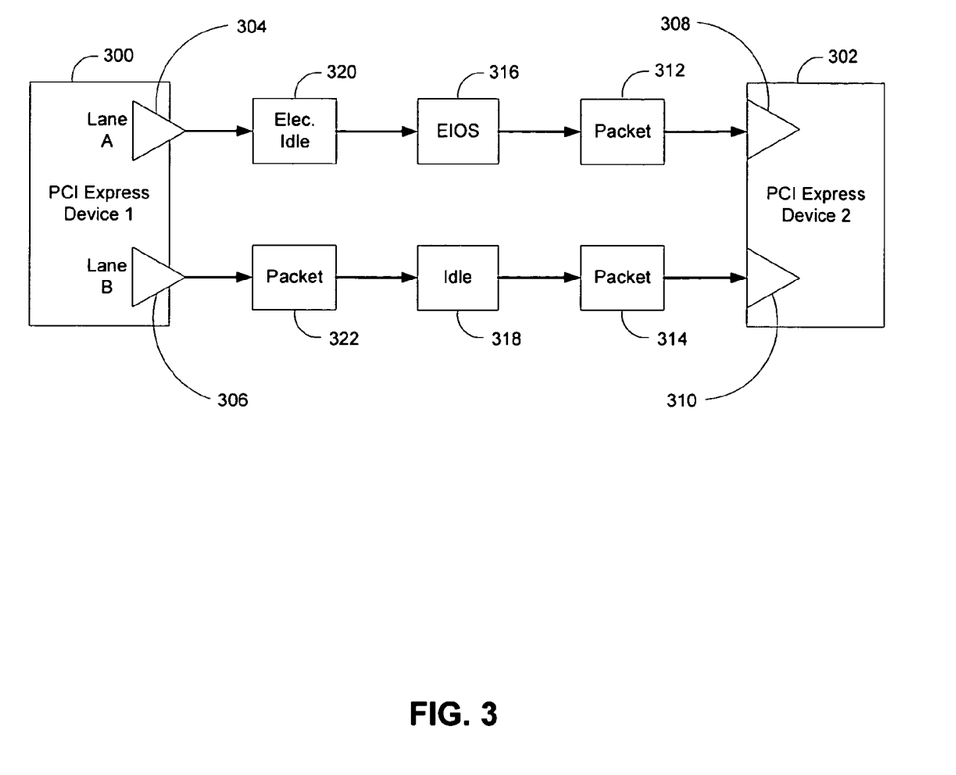
FIG. 3 illustrates one embodiment of the process required to transition one or more lanes in a PCI-Express™ multi-lane link from the L0 power state to the L0s power state.

In one embodiment, logic within or related to device 1 determines that 3 of the 4 transmission lanes will be transitioned from the L0 power state to the L0s power state. This determination can be made based on a power consumption algorithm, a data throughput algorithm, other logic within the device, logic external to the device (such as system management logic), or from another source. FIG. 3 illustrates one embodiment of the process required to transition one or more lanes in a PCI-Express™ multi-lane link from the L0 power state to the L0s power state. For ease of understanding, the figure is limited to illustrating one lane that will transition from the L0 power state to the L0s power state and one lane that will be kept in the L0 power state. Although, this figure could be expanded to illustrate a link with any number of lanes. Any lane of a link that transitions from the L0 power state to the L0s power state would have the same set of steps shown for Lane A in FIG. 3. Any lane of a link that is kept in the L0 power state during the transition period for one or more other lanes would have the same set of steps shown for Lane B in FIG. 3.

Thus, in the embodiment illustrated in FIG. 3, Device 1 (300) and Device 2 (302) are both coupled to a 2-lane PCI-Express™ link. In many embodiments, this link is a full duplex link, as described in detail with reference to FIG. 2. The entirety of the full duplex link is not shown in FIG. 3, only the lanes transmitting data from Device 1 (300) to Device 2 (302) are shown for simplicity. Device 1 (300) has a first transmitter 304 that sends data to Device 2 (302) in Lane A and a second transmitter 306 that sends data to Device 2 (302) in Lane B. To receive the data sent in these two lanes, Device 2 (302) has a first receiver 308 that receives data from Device 1 (300) in Lane A and a second receiver 310 that receives data from Device 1 (300) in Lane B.

In this embodiment, it is assumed that at the start of this process, both lanes are fully operational in the L0 power state. In one embodiment, Device 1 (300) has determined that it wants to transition Lane A from the L0 power state to the L0s power state and keep Lane B in the L0 power state. To accomplish this, Device 1 (300) finishes any operations related to sending the current data packets in each lane. In this embodiment, Device 1 (300) finishes sending the current packets in each lane, Packet 312 in Lane A and Packet 314 in Lane B. Next, Device 1 sends an electrical idle ordered set (EIOS) 316 in Lane A and idle symbols 318 in Lane B. In one embodiment, the number of EIOS's is greater than one, thus however it takes to send the one or more EIOS's in Lane A, Lane B must transmit logical idle symbols. Finally, once Device 2 (302) has effectively received the EIOS, Device 1 (300) can then put Lane A into electrical idle 320 and resume sending normal data packets 322 in Lane B. Once Lane A enters electrical idle, it has entered the L0s power state. For clarification, the boxes that explain the signals, data, sets, information, packets, etc. (i.e. 312-322) are just meant to represent the order that these items are sent across each lane, they are not representative of the size or format of what is sent.

In this embodiment, once Lane A has entered the L0s power state, it does not need to subsequently participate in transmitting the mandatory UpdateFC flow control packets that regularly have to be sent from Device 1 (300) to Device 2 (302). Thus, instead of an x2 link sending the UpdateFC flow control packets, now there is an x1 link that sends these packets. Effectively, the PCI-Express™ link from Device 1 (300) to Device 2 (302) has been cut from two lanes down to one. Thus, the bandwidth of the link in this particular direction has been halved but also the power consumption of the transmitters has been cut in half (transmitter 304 can be turned off).

As mentioned above, in different embodiments, this identical process can take place cutting any link width greater than 1 down to any supported link width greater than 0. For example, in one embodiment, a x16 PCI-Express™ link can have up to 15 of its lanes turned off (i.e. transitioned from the L0 power state to the L0s power state). At least one lane must remain operational in the L0 power state or return from L0s state to L0 so at least the UpdateFC flow control packets can continue to be sent periodically. This saves significant power because the transmitters (304 and 306) and their corresponding receivers on the other device consume a large portion of the power that Device 1 (300) and Device 2 (302) consume and in the above referenced case, 15/16ths of them are turned off. Any combination of lanes can be turned on or off based on the needs of data throughput performance as well as power consumption savings. Thus, for example, in a x16 link, not only is it possible to have 15 lanes turned off for a prolonged time, but also combinations such as 8 lanes on/8 lanes off, 12 on/4 off, 4 on/12 off, 2 on/14 off, and so on. The same process as described above in reference to FIG. 3 applies for every lane that is to be turned off (transitioned from the L0 power state to the L0s power state).

Once a certain number (1 to N−1) of lanes have been turned off, it is crucial to have the ability to turn them back on again. Thus, it is crucial to have the ability to transition one or more lanes of a PCI-Express™ link from the L0s power state back to the L0 power state, while maintaining the other lanes that were kept in the L0 power state to remain in the L0 power state. Not all lanes that were originally transitioned into the L0s power state would require returning to the L0 power state. In other words, it is beneficial to allow for either all of the lanes in the L0s power state to transition back to the L0 power state or for a subset of the lanes in the L0s power state to transition back to the L0 power state. Regardless of the number of lanes needing transition, this transition process from the L0s power state to the L0 power state can be illustrated on a lane by lane basis, just like the opposite transition illustrated above in reference to FIG. 3.

Figure 4:
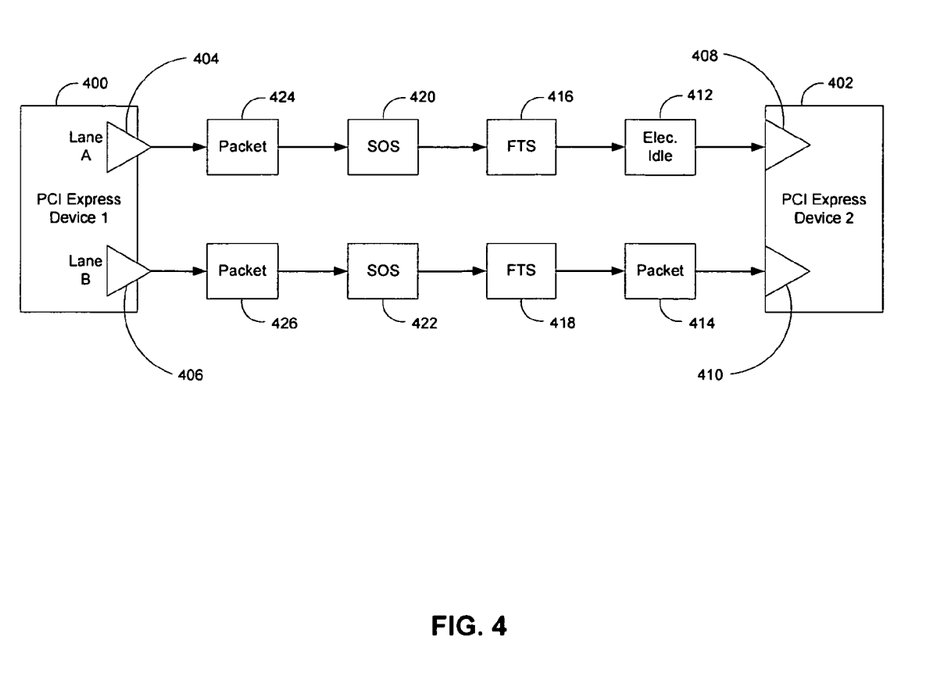
FIG. 4 illustrates one embodiment of the process required to transition one or more lanes in a PCI-Express™ multi-lane link from the L0s power state back to the L0 power state.

FIG. 4 illustrates one embodiment of the process required to transition one or more lanes in a PCI-Express™ multi-lane link from the L0s power state back to the L0 power state. For ease of understanding, the figure is limited to illustrating one lane that will transition from the L0s power state back to the L0 power state and one lane that will be kept in the L0 power state.

Although, this figure could be expanded to illustrate a link with any number of lanes. Any lane of a link that transitions from the L0s power state to the L0 power state would have the same set of steps shown for Lane A in FIG. 4. Any lane of a link that is kept in the L0 power state during the transition period for one or more other lanes would have the same set of steps shown for Lane B in FIG. 4.

Thus, in the embodiment illustrated in FIG. 4, Device 1 (400) and Device 2 (402) are both coupled to a 2-lane PCI-Express™ link. In many embodiments, this link is a full duplex link, as described in detail with reference to FIG. 2. The entirety of the full duplex link is not shown in FIG. 4, only the lanes transmitting data from Device 1 (400) to Device 2 (402) are shown for simplicity. Device 1 (400) has a first transmitter 404 that sends data to Device 2 (402) in Lane A and a second transmitter 406 that sends data to Device 2 (402) in Lane B. To receive the data sent in these two lanes, Device 2 (402) has a first receiver 308 that receives data from Device 1 (400) in Lane A and a second receiver 310 that receives data from Device 1 (400) in Lane B.

In this embodiment, it is assumed that at the start of this process, Lane A is in the L0s power state and Lane B is fully operational in the L0 power state. In one embodiment, Device 1 (400) has determined that it wants to transition Lane A from the L0s power state to the L0 power state and keep Lane B in the L0 power state. To accomplish this, Device 1 (400) finishes any operations related to sending the current data packet in fully operational Lane B. In this embodiment, Device 1 (400) finishes sending Packet 414 in Lane B. At this point, Lane A is still in electrical idle 412. Next, Device 1 (400) transmits one or more fast training sequences (FTS) (416 and 418) across both lanes, Lane A and Lane B to Device 2 (402). In one embodiment, Device 2 (402) requires Device 1 (400) to send multiple FTS's in each lane.

Device 1 (400) sends a skip ordered set (SOS) (420 and 422) in both Lane A and Lane B after transmitting the FTS sequences. The SOS is sent to allow the lanes to deskew. At this point all lanes that had the SOS sent become active and data packets can once again be sent on both Lane A and Lane B from Device 1 (400) to Device 2 (402). In one embodiment, if any lane fails to come out of the L0s state by not achieving symbol lock or by some other issue this will bring the link into the Recovery state. The Recovery state in the PCI-Express™ specification forces all lanes in both directions to become active and the link can be brought back up that way.

FIGS. 3 and 4 show a single lane on a PCI-Express™ link transitioning from the L0 power state to the L0s power state and from the L0s power state to the L0 power state. As previously mentioned, this process can be performed for any number of lanes of a PCI-Express™ link except for the entire set of lanes. The process can be performed simultaneously on multiple lanes or sequentially. Additionally, this process can be performed in both directions. Thus, the transitions can occur on the portion of the lanes transmitting from Device 1 to Device 2 as well as the portion of the lanes transmitting from Device 2 to Device 1.

Furthermore, the transitions can occur on the transmission lines in both directions symmetrically or asymmetrically. Thus, in an asymmetric embodiment, the portions of the lanes transmitting in one direction (e.g., from Device 1 to Device 2) can have transmission lines turned off and on, while the portions of the lanes transmitting in the other direction (e.g., from Device 2 to Device 1) can all remain on. Whereas, in a symmetric embodiment, each full duplex lane (as described in detail in reference to FIG. 2) is turned on or off as a single unit. Thus, in this embodiment, if the half of the transmission lanes from Device 1 to Device 2 are turned off, it is required that the same half of the transmission lanes from Device 2 to Device 1 be turned off.

In one symmetric embodiment, one of the two devices acts as a master and the other as a slave. Thus, in this embodiment, one device determines all lanes that are on or off for both devices. In this embodiment, the master initiates the reduction in the number of operational lanes by transmitting EIOS sets on the one or more lanes that are to be deactivated (i.e., turned off). The EIOS sets are followed by electrical idle while the other lanes carry normal idle patterns. The slave replies back with EIOS sets on those lanes after which the master and slave can resume normal transaction layer packet (TLP)/DLLP transmission on the new set of reduced lanes.

In this embodiment, some of the lanes that are deactivated can be resumed by the master sending FTS on the sets of lanes designated to be fully operational to the slave. The master then waits for the slave to reply back with the FTS. After both sides complete the FTS transmission and receipt, normal TLP/DLLP transmissions can resume. In this embodiment, the slave can request the master to reduce and/or upgrade the width by sending a vendor defined DLLP (or TLP) specifying the link width the slave requests to operate with.

In another embodiment, the exit electrical idle detection circuitry within each device can be completely turned off to lower the power consumption of each device further. In this embodiment, the subset of lanes that remain active can decode the FTS and wake up the receiver on all applicable lanes, determine which lanes are receiving the FTS, and then turn off the remaining lanes.

In another embodiment, the power savings scheme that has been discussed can also be extended to cover faulty lanes. In one embodiment, once a device discovers that there is a lane fault in a certain direction on a given lane, this process can be applied to turn off the faulty lane in one or both directions.

Figure 5:
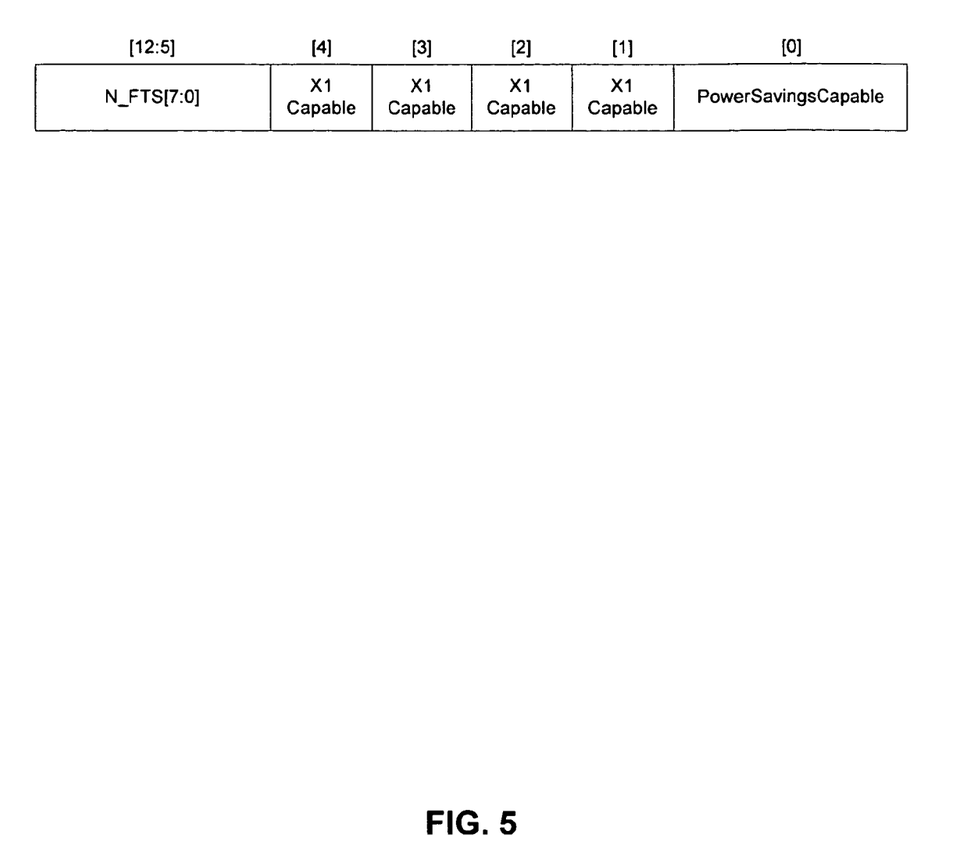
FIG. 5 illustrates one embodiment of a detailed view of a capabilities register within a device capable of PCI-Express™ lane power savings.

Now turning to the next figure, FIG. 5 illustrates one embodiment of a detailed view of a capabilities register within a device capable of PCI-Express™ lane power savings. In one embodiment, each device with the ability to transition each lane independently on a PCI-Express™ multi-lane link between the L0 power state and the L0s power state has a register 500 associated with it that includes the following fields: N_FTS[7:0], X1capable, X2capable, X4capable, X8capable, and PowerSavingsCapable. If a first device wants to determine what power savings capabilities a second device has, it can poll the second device and read the capabilities register. In one embodiment, bit [0] is a PowerSavingsCapable bit which specifies whether the second device can reduce power consumption by sending one or more lanes of a multi-lane PCI-Express™ link into the L0s power state. The next four bits, bits [4:1], inform the first device whether the second device is able to run x8, x4, x2, and x1 wide modified links. Finally, bits [12:5], N_FTS[7:0] specifies the number of FTS's to send to the device during an activation of a given lane (i.e. a lane transitioning from the L0s power state to the L0 power state). In one embodiment, device 1 polls this register in device 2 to determine device 2's power savings capabilities. In another embodiment, an identical register is located in device 1. In this embodiment, device 2 can perform the same poll to determine device 1's power savings capabilities.

Alternatively, in another embodiment, instead of utilizing a capabilities register to inform other devices of a device's power savings capabilities, both device 1 and device 2 can send vendor defined DLLPs (or TLP messages) advertising each device's capabilities. The other device, upon seeing the vendor defined packet can update its control and status registers (CSRs) to correspond to the other device's capabilities.

Figure 6:
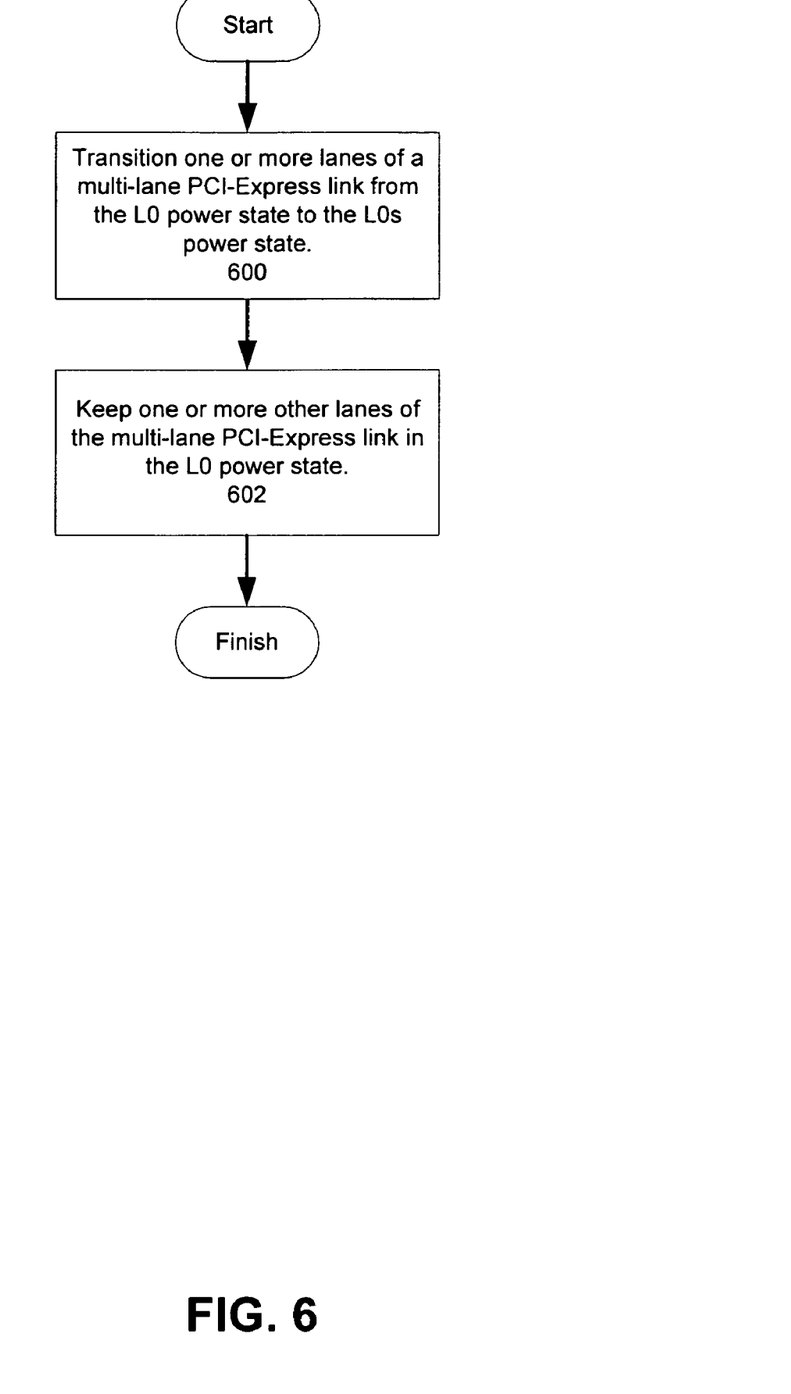
FIG. 6 describes an embodiment of a flow diagram of a method to transition one or more lanes of a multi-lane PCI-Express™ link from the L0 power state to the L0s power state.

Now turning to the next figure, FIG. 6 describes an embodiment of a flow diagram of a method to transition one or more lanes of a multi-lane PCI-Express™ link from the L0 power state to the L0s power state. The process is performed by processing logic that may comprise hardware (circuitry, dedicated logic, etc.), software (such as is run on a general purpose computer system or a dedicated machine), or a combination of both. The process begins by processing logic transitioning one or more lanes of a multi-lane PCI-Express™ link from the L0 power state to the L0s power state (processing block 600). In different embodiments, the number of lanes that can be transitioned while implementing this power savings process is a number from 1 to N−1, where N is the number of physical lanes in the link. Next, processing logic keeps one or more lanes of the multi-lane PCI-Express™ link in the L0 power state (processing block 602) and the process is finished. The number of lanes that remain in the L0 power state is the complement of the number of lanes that were transitioned to the L0s power state in processing block 600. For example, if the PCI-Express™ link comprises an x16 link and 8 lanes are transitioned to the L0s power state, then 8 lanes would remain in the L0 power state.

Thus, Embodiments of a method, device, and system to use asymmetric lanes dynamically in a multi-lane serial link to reduce power consumption are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

The invention claimed is:

1. A system, comprising:
    a multi-lane serial link coupling a first device to a second device;
    the first device coupled to the link, the first device comprising logic to:
        transition one or more transmitting lanes of the link from a fully operational power state to a low power state;
        keep one or more transmitting lanes of the link in the fully operational power state;
        transmit data across the link on just the one or more transmitting lanes of the link kept in the fully operational power state; and
        send one or more communication packets to the second device indicating it is capable of at least transitioning one or more transmitting lanes from the fully operational power state to the low power state, keeping one or more transmitting lanes in the fully operational power state, and transmitting data across the link on just the one or more transmitting lanes of the link kept in the fully operational power state; and
    the second device comprising logic to:
        detect the transition of the one or more lanes of the link from the fully operational power state to the low power state;
        upon detection, modify its data receiving capabilities to receive data on just the one or more transmitting lanes of the link kept in the fully operational power state; and
        send one or more communication packets to the first device indicating it is capable of at least detecting the transition of one or more lanes from the fully operational power state to the low power state, and upon detection, modifying its data receiving capabilities to receive data on just the one or more transmitting lanes of the link kept in the fully operational power state.

2. The system of claim 1, wherein the multi-lane serial link is a PCI-Express link.

3. The system of claim 2, wherein the low power state is the L0s power state and the fully operational power state is the L0 power state.

4. The system of claim 3, wherein the first device further comprises logic to transmit one or more UpdateFC flow control packets on the one or more lanes kept in the L0 power state.

5. The system of claim 4, wherein the second device further comprises logic to receive the one or more UpdateFC flow control packets on the one or more lanes kept in the L0 power state.

6. The system of claim 3, wherein the first device further comprises logic to:
    send electrical idle ordered sets (EIOS) on the one or more lanes transitioning from the L0 power state to the L0s power state; and
    send an idle pattern on the one or more lanes remaining in the L0 power state.

7. The system of claim 6, wherein logic to detect the transition of one or more lanes of the link from the L0 power state to the L0s power state further comprises logic to detect electrical idle ordered sets (EIOS) on the one or more lanes transitioning from the L0 power state to the L0s power state.

8. The system of claim 3, wherein the first device further comprises logic to:
    after the transition of the one or more lanes of the multi-lane PCI-Express link to the L0s power state, transition at least one of the one or more lanes of the multi-lane PCI-Express link in the L0s power state back to the L0 power state.

9. The system of claim 8, wherein logic to transition at least one of the one or more lanes of the multi-lane PCI-Express link in the L0s power state back to the L0 power state further comprises logic to:
    send one or more fast training sets (FTS) on the at least one of the one or more lanes in the L0s power state; and
    send one or more skip ordered sets (SOS) on the at least one of the one or more lanes in the L0s power state.

10. The system of claim 3, further comprising:
    the first device comprising logic to set a capabilities register to indicate it is capable of at least transitioning one or more transmitting lanes from an L0 power state to an L0s power state, keeping one or more transmitting lanes in an L0 power state, and transmitting data across the link on just the one or more transmitting lanes of the link kept in the L0 power state; and
    the second device comprising logic to set a capabilities register to indicate it is capable of at least detecting the transition of one or more lanes from an L0 power state to an L0s power state, and upon detection, modifying its data receiving capabilities to receive data on just the one or more transmitting lanes of the link kept in the L0 power state.

* * * * *